(12) United States Patent
Sawyer et al.

(10) Patent No.: US 10,828,960 B2
(45) Date of Patent: Nov. 10, 2020

(54) VEHICLE VENTILATION SYSTEM INCORPORATING AN INLET DUCT INCLUDING A POPPET VALVE

(71) Applicant: FORD GLOBAL TECHNOLOGIES, LLC, Dearborn, MI (US)

(72) Inventors: Robert Steven Sawyer, Farmington Hills, MI (US); Michael Steven Wallis, Belleville, MI (US); Charles Robert Stanton, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 841 days.

(21) Appl. No.: 14/625,843

(22) Filed: Feb. 19, 2015

(65) Prior Publication Data
US 2016/0243921 A1    Aug. 25, 2016

(51) Int. Cl.
*B60H 1/00*    (2006.01)
(52) U.S. Cl.
CPC ..... *B60H 1/00849* (2013.01); *B60H 1/00685* (2013.01); *B60H 2001/00085* (2013.01)
(58) Field of Classification Search
CPC ................................. B60H 1/00849
USPC ................ 454/143, 149, 150, 151, 165, 160
See application file for complete search history.

(56) References Cited

U.S. PATENT DOCUMENTS

| | | | |
|---|---|---|---|
| 4,406,214 A | 9/1983 | Sakurai | |
| 4,834,170 A | 5/1989 | Sakurada et al. | |
| 5,010,916 A * | 4/1991 | Albrecht | F16K 15/028 137/454.2 |
| 6,168,515 B1 | 1/2001 | Daimon et al. | |
| 6,958,009 B2 | 10/2005 | Shindou et al. | |
| 6,971,628 B2 * | 12/2005 | Ichimaru | F16K 11/044 137/625.27 |
| 7,958,740 B2 * | 6/2011 | Hirai | B60H 1/00785 165/223 |

FOREIGN PATENT DOCUMENTS

| | | | | |
|---|---|---|---|---|
| CN | 202851990 U | | 4/2013 | |
| DE | 2113903 A1 * | | 9/1972 | ......... B60H 1/00485 |
| GB | 2123947 A * | | 2/1984 | ......... B60H 1/00442 |

OTHER PUBLICATIONS

Machine Translation of DE 2113903.*
English Translation of CN202851990U dated Apr. 3, 2013.
Office Action dated Jun. 17, 2020 for CN Application No. 2016100874762 filed Feb. 16, 2016.

* cited by examiner

*Primary Examiner* — Steven B McAllister
*Assistant Examiner* — Elizabeth M. May
(74) *Attorney, Agent, or Firm* — David Coppiellie; King & Schickli, PLLC

(57) ABSTRACT

A vehicle ventilation system includes an inlet duct incorporating a poppet valve. The system also includes an evaporator core, a heater core, an air discharge duct and a blower. The blower moves air from the inlet duct through at least one of the evaporator core and the heater core to be discharged through the air discharge duct.

18 Claims, 9 Drawing Sheets

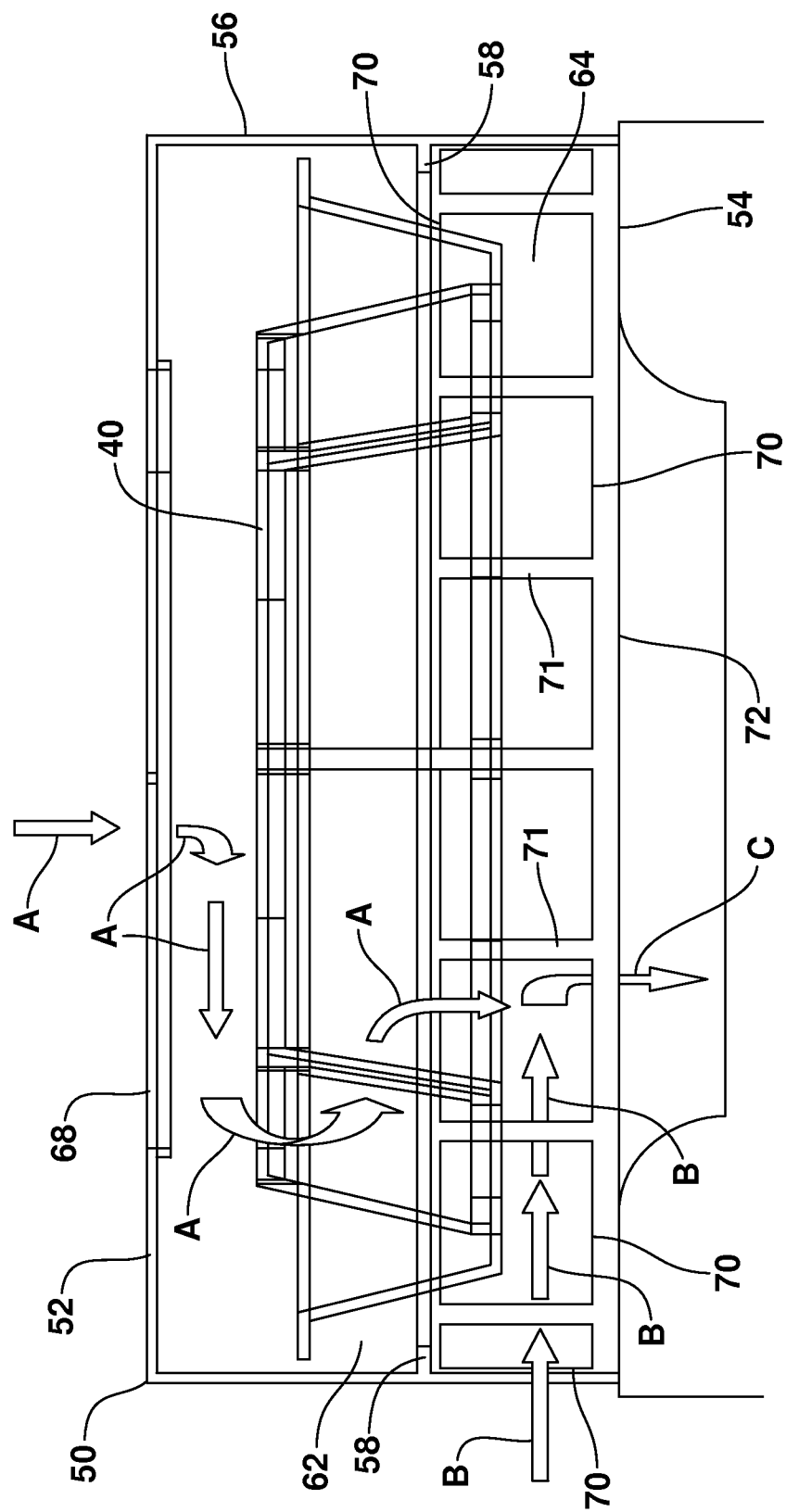

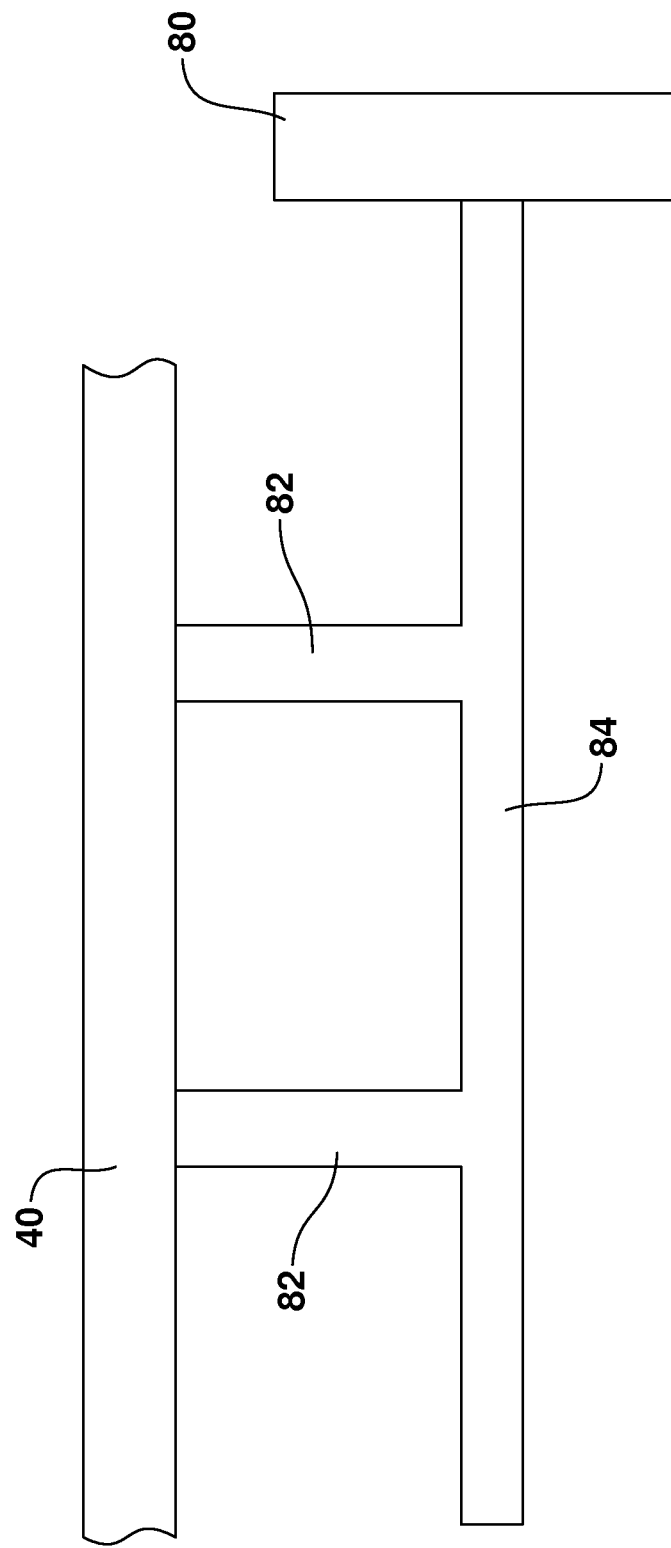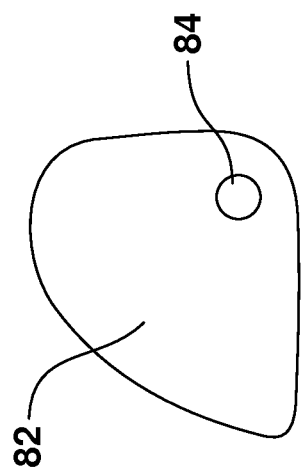

VEHICLE VENTILATION SYSTEM INCORPORATING AN INLET DUCT INCLUDING A POPPET VALVE

TECHNICAL FIELD

This document relates generally to the motor vehicle equipment field and, more particularly, to a vehicle ventilation system that incorporates an inlet duct including a poppet valve to provide a significant number of benefits and advantages over current state-of-the-art swinging door and flap valve systems.

BACKGROUND

State-of-the-art vehicle ventilation systems typically utilize some sort of doors/flaps to change from fresh air (outside air) to recirculating interior air. Such a state-of-the-art system is disclosed in FIG. 1 which illustrates an inlet duct housing H including a fresh air inlet F in the top wall, a recirculating air inlet R in one sidewall, and a blower inlet O in the bottom wall. The door or flap D may be pivoted about the pivot P between a first, full line position, closing the fresh air inlet F and a second phantom line position closing the recirculating air inlet R. As should be appreciated, such a swinging or pivoting door D only allows for two simple inlets from two different directions (i.e. fresh air inlet F in the top wall and recirculating air inlet R in the sidewall).

This document relates to a new and improved vehicle ventilation system incorporating an inlet duct having a poppet valve. In contrast to the swinging motion of the door D utilized in the prior art inlet duct illustrated in FIG. 1, a poppet valve uses linear motion thereby allowing recirculating air to be brought in from multiple directions and not just one single sidewall inlet R. Advantageously, a vehicle ventilation system incorporating an inlet duct with a poppet valve provides a number of benefits including, but not limited to improved blower efficiency, improved packaging, improved sealing, lower blower motor power consumption, lower pressure drop across the inlet duct as well as lower tooling costs.

SUMMARY

In accordance with the purposes and benefits described herein, a vehicle ventilation system is provided. That vehicle ventilation system comprises an inlet duct including a poppet valve, an evaporator core, a heater core, an air discharge duct and a blower. The blower moves air from the inlet duct through at least one of the evaporator core and the heater core to the air discharge duct.

More specifically, the inlet duct includes a housing having a fresh air inlet and a recirculating air inlet. The poppet valve is displaceable between a first position opening only the fresh air inlet, a second position opening only the recirculating air inlet and a third position opening both the fresh air inlet and the recirculating air inlet.

In one possible embodiment, the housing includes a first end wall, a second end wall and a cylindrical sidewall. The fresh air inlet is provided in the first end wall and the recirculating air inlet is provided in the cylindrical sidewall. In addition, a blower inlet is provided in the second end wall opposite the fresh air inlet.

Still further, the system includes an inlet manifold in the housing and a partition that divides that inlet manifold into a first chamber and a second chamber. The fresh air inlet opens into the first chamber and the recirculating air inlet opens into the second chamber. Further the blower inlet also opens into the second chamber. The partition includes an air flow aperture and the poppet valve seats on the partition and extends through the air flow aperture when in the first position.

The poppet valve includes a fresh air inlet sealing face, a fresh air passageway and a recirculating air inlet sealing face. The fresh air passageway extends concentrically around the fresh air inlet sealing face and the recirculating air inlet sealing face extends concentrically around the fresh air passageway.

The system further includes an actuator displacing the poppet valve between the first position, the second position and the third position. The actuator may assume a number of different forms including, but not limited to, a vacuum motor, an electric motor, a pneumatic drive or the like. In one possible embodiment, the actuator includes a cam that engages and moves the poppet valve. Further, the poppet valve includes guide pins that ride in guide channels provided in the housing.

In accordance with an additional aspect, a motor vehicle is provided including the vehicle ventilation system just described.

In yet another aspect, a method is provided for controlling the flow of fresh air and recirculating air through the vehicle ventilation system. That method may be broadly described as comprising the step of equipping an air inlet duct having a fresh air inlet, a recirculating air inlet and a blower inlet with a poppet valve. Still further, the method may include displacing the poppet valve between a first position opening only the fresh air inlet, a second position opening only the recirculating air inlet and a third position opening both the fresh air inlet and the recirculating air inlet. In addition the method may also include the step of drawing air from the inlet duct through the blower inlet by means of a blower.

In the following description, there are shown and described several preferred embodiments of the vehicle ventilation system. As it should be realized, the vehicle ventilation system is capable of other, different embodiments and its several details are capable of modification in various, obvious aspects all without departing from the vehicle ventilation system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle ventilation system and together with the description serve to explain certain principles thereof. In the drawing figures:

FIG. 7 is yet another schematic elevational view illustrating the poppet valve in an intermediate position opening both the fresh air inlet and the recirculating air inlet to the blower inlet.

FIGS. 8a and 8b are schematic illustrations of one possible actuator for displacing the poppet valve between the first, second and third positions.

Reference will now be made in detail to the present preferred embodiments of the vehicle ventilation system, examples of which are illustrated in the accompanying drawing figures.

DETAILED DESCRIPTION

Figure 2:
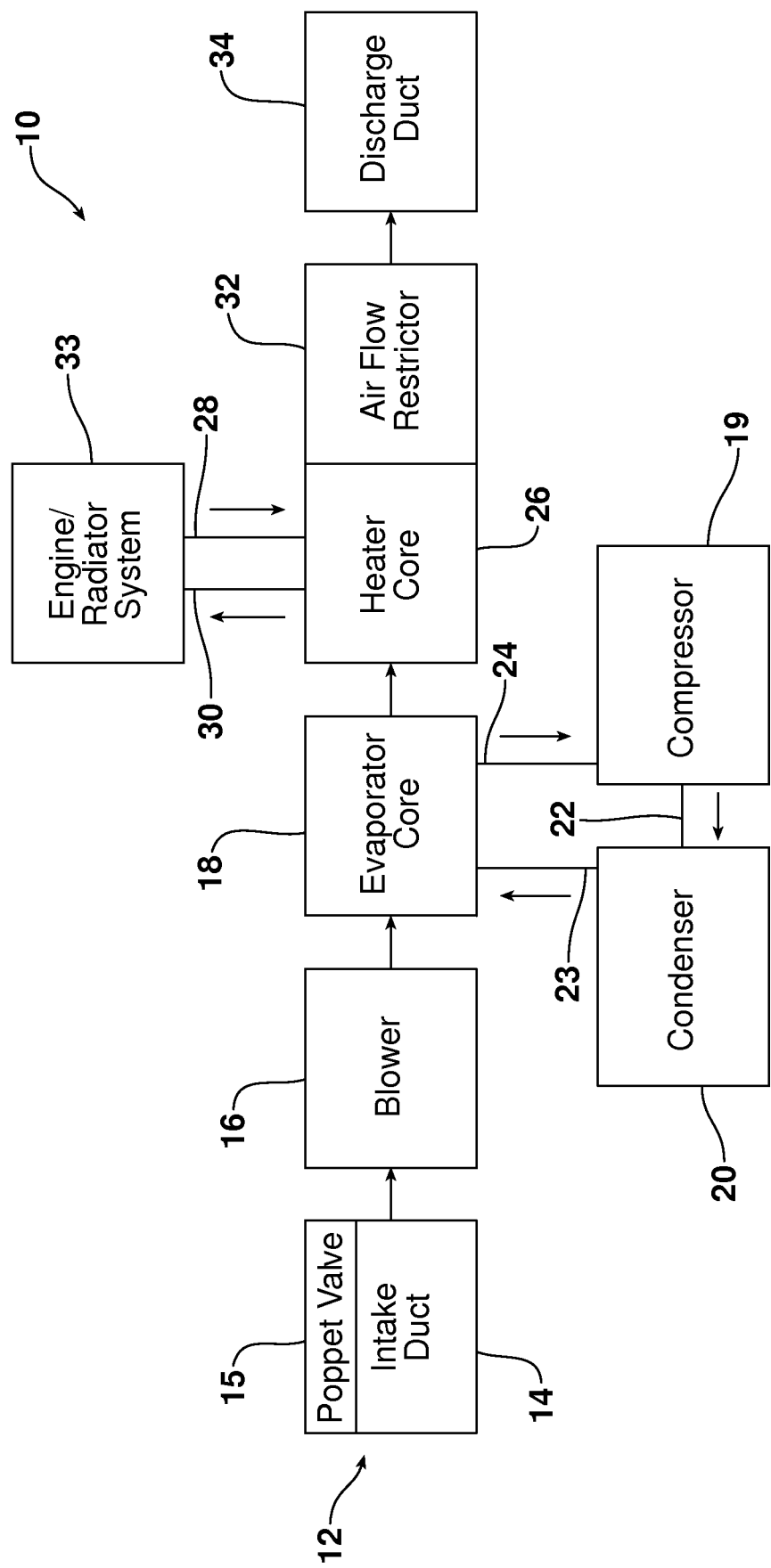
FIG. 2 is a schematic block diagram of the new and improved vehicle ventilation system that is the subject matter of this document.

Reference is now made to FIG. 2 which schematically illustrates the vehicle ventilation system 10. For purposes of this description the middle, horizontal line of blocks represents the airflow circuit 12 and the arrows between the blocks in that horizontal line represent airflow conduits.

As illustrated, the airflow circuit 12 includes an intake or manifold duct 14. The intake duct 14 includes a poppet valve 15. As described in greater detail below, the poppet valve 15 is positioned to selectively direct (a) only fresh air, (b) only recirculated air from the interior of the vehicle or (c) a mixture of both (a) and (b) into the intake duct 14. A blower 16 draws air from the intake duct 14 and then forces that air through the evaporator core 18. There the air is cooled and dehumidified through heat exchange with a refrigerant fluid of the vehicle air-conditioning system. That refrigerant fluid flows between a compressor 19, a condenser 20 and the evaporator core 18 through the lines 22, 23, 24. More specifically, cool refrigerant is delivered from the condenser 20 to the evaporator core 18 through the line 23. That cool refrigerant absorbs heat from the air forced through the evaporator core 18 by the blower 16 and then is returned to the compressor 19 through the line 24. After compression, the refrigerant is routed through the line 22 to the condenser 20 where it is again cooled before being recycled back to the evaporator core 18.

After being cooled and dehumidified, the air is forced by the blower 16 through the heater core 26 located in the airflow circuit 12 downstream from the evaporator core 18. As should be appreciated, the heater core 26 is connected by lines 28 and 30 to the engine and radiator system 33. In winter, hot engine coolant is pumped through the line 28 from the engine to the heater core 26 where it heats the air being forced through the heater core by means of heat exchange before being returned to the engine/radiator system through the line 30.

After being dehumidified in the evaporator core 18 and warmed in the heater core 26, the air in the airflow circuit 12 is forced by the blower 16 through the airflow restrictor 32 to one or more of a number of discharge ducts 34 provided in the vehicle so as to clear fog from the windscreen and/or heat the vehicle cabin. In summer, the air flow either bypasses the heater core 26 or no hot engine coolant is circulated through the heater core from the engine/radiator system 33.

Figure 3:
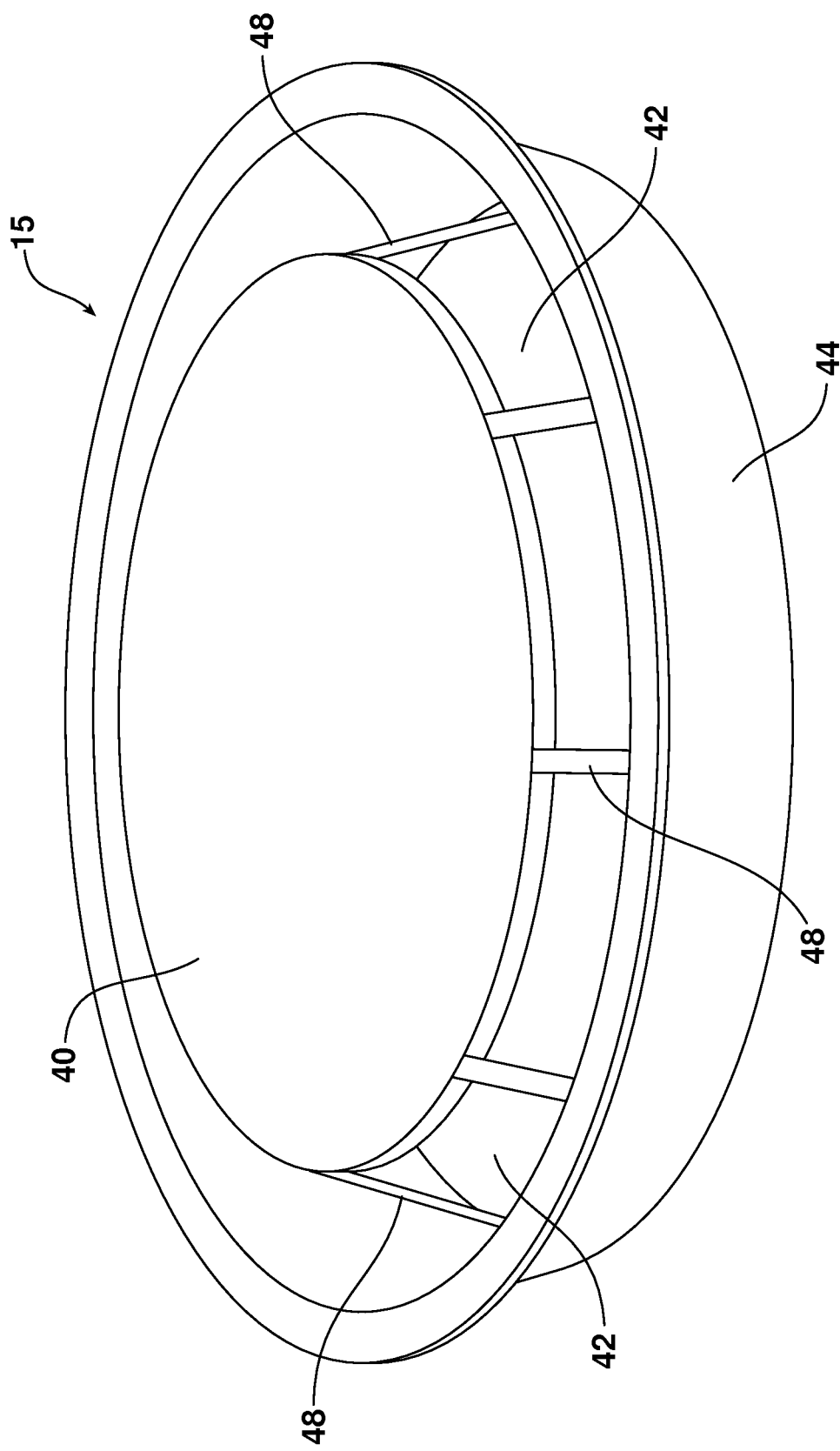
FIG. 3 is a perspective view of the poppet valve that is provided in the air inlet duct.
Figure 4:
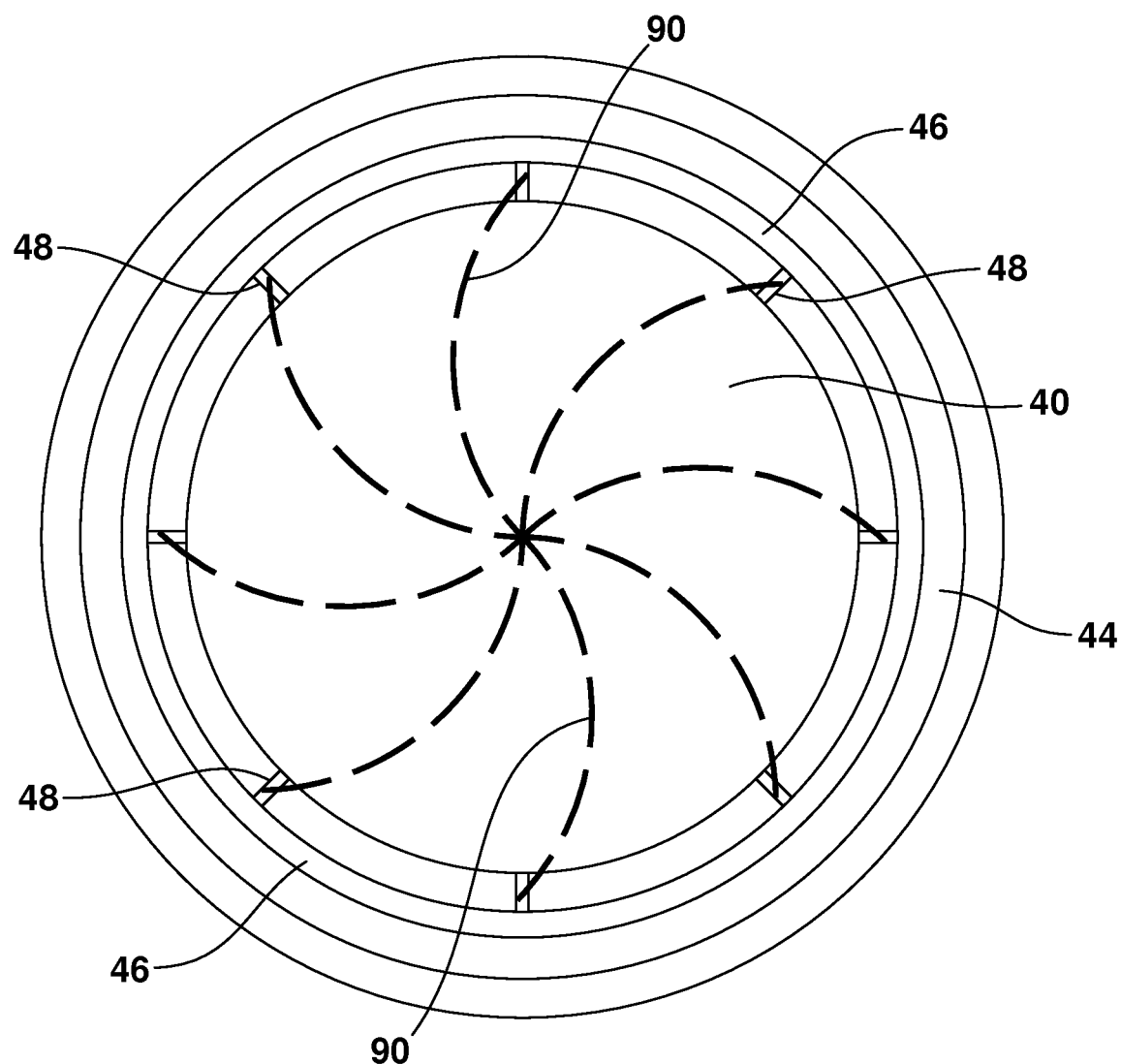
FIG. 4 is a top plan view of the poppet valve shown in FIG. 3.

Reference is now made to FIGS. 3 and 4 which are detailed illustrations of the poppet valve 15. As illustrated, the poppet valve 15 includes a fresh air inlet sealing face 40, a fresh air passageway 42 and a recirculating air inlet sealing face 44. More specifically, the fresh air inlet sealing face 40 is connected to a lower lip 46 of the recirculating air sealing face 44 by means of a series of spaced posts 48. The fresh air passageway 42 is designed all the way around the poppet valve 15 between the posts 48. Thus, it should be appreciated that the fresh air passageway 42 extends concentrically around the fresh air inlet sealing face 40 while the recirculating air inlet sealing face 44 extends concentrically around the fresh air passageway 42.

Figure 5:
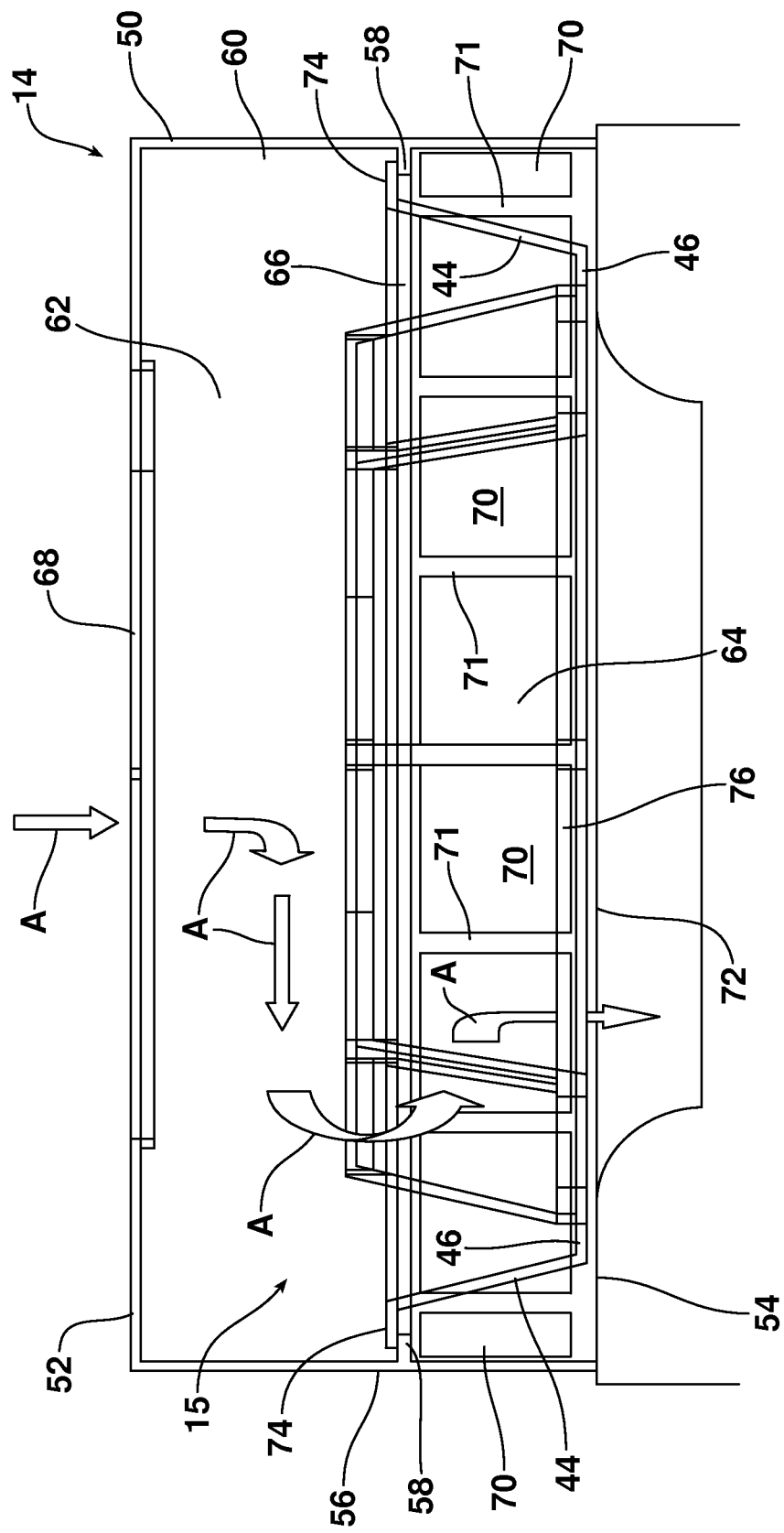
FIG. 5 is a schematic elevational view illustrating the poppet valve in a first position opening only the fresh air inlet to the blower inlet.
Figure 6:
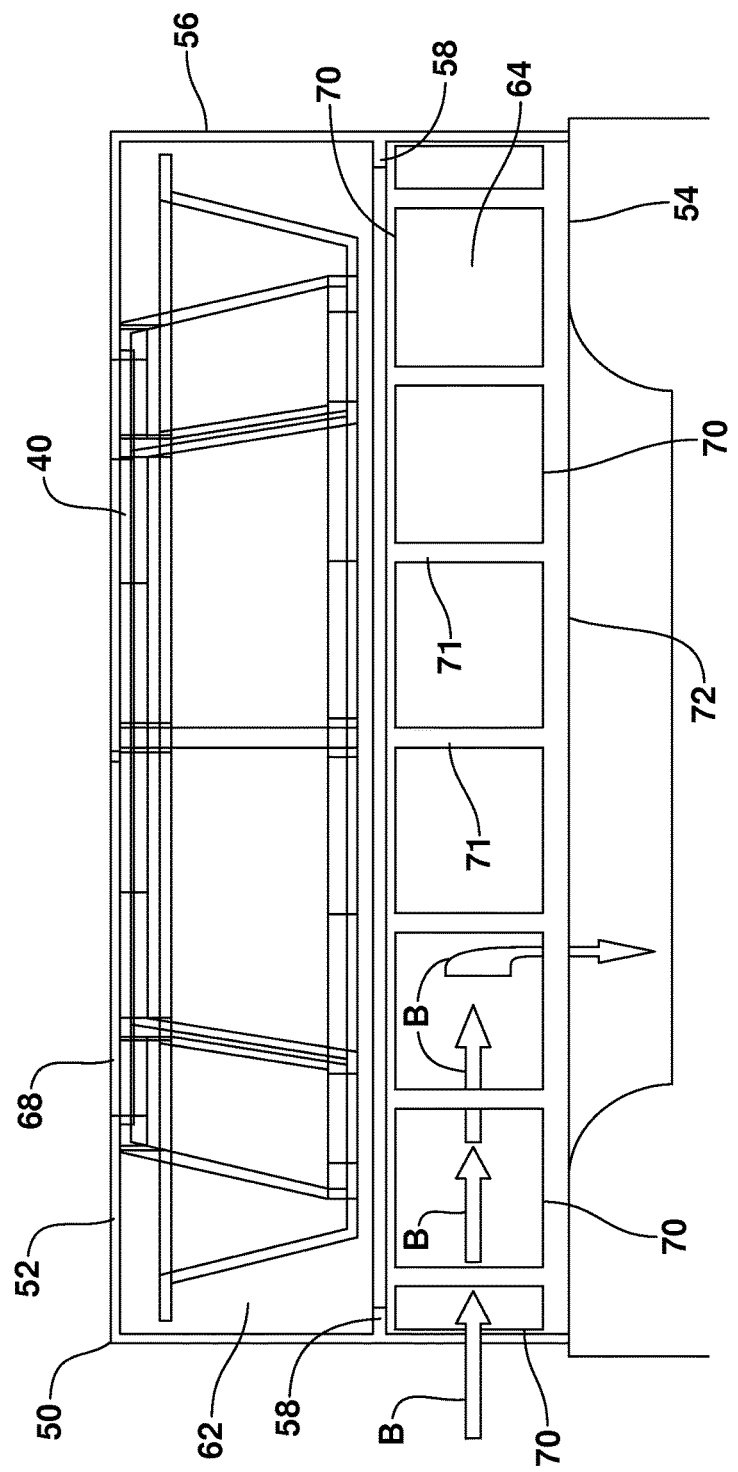
FIG. 6 is a schematic elevational view illustrating the poppet valve in a second position opening only the recirculating air inlet to the blower inlet.

Reference is now made to FIGS. 5-7 illustrating the poppet valve 15 in the inlet duct 14 in respective first, second and third operating positions.

More specifically the inlet duct 14 includes a housing 50 having a first end wall or top wall 52, a second end wall or bottom wall 54 and a cylindrical sidewall 56 extending between the first and second end walls. A partition 58 divides the inlet manifold 60 within the housing 50 into a first or upper chamber 62 and a second or lower chamber 64. The partition 58 includes a central air flow aperture 66 that provides communication between the two chambers 62, 64 and through which the poppet valve 15 is moved between operating positions.

A fresh air inlet 68 is provided in the first end wall 52. The recirculating air inlet 70 is provided in the cylindrical sidewall 56. That recirculating air inlet 70 may extend substantially 360° around the cylindrical sidewall 56 between wall segments 71. A blower inlet 72 is provided in the second end wall or bottom wall 54. Thus, it should be appreciated that the blower inlet 72 is opposite the fresh air inlet 68. Further, the fresh air inlet 68 opens into the first or upper chamber 62 while both the recirculating air inlet 70 and blower inlet 72 open into the second or lower chamber 64.

Reference is now made to FIG. 5 which illustrates the poppet valve 15 in a first operating position wherein the upper, outwardly projecting lip 74 of the recirculating air sealing face 44 seats against the upper face of the partition 58 and the lower, inwardly projecting lip 46 seats against the bottom wall 54 of the inlet duct 14 completely around the blower inlet 72. This effectively seals off airflow from the recirculating air inlet 70 to the blower inlet 72. As should be appreciated, when the poppet valve 15 is in this position, the fresh air inlet sealing face 40 is positioned away from the fresh air inlet 68 and fresh air is free to flow through the inlet 68 into the first or upper chamber 62 and then through the fresh air passageway 42 in the poppet valve 15, downwardly through the central flow aperture 76 provided concentrically within the lower lip 46 of the poppet valve 15 and then through the blower inlet 72 to the blower 16. Note particularly action arrows A in FIG. 5. When the poppet valve 15 is in the first position, it should be appreciated that only fresh air is directed through the inlet duct 14 to the blower 16. Any flow of recirculating air is cut off by the poppet valve 15.

Figure 1:
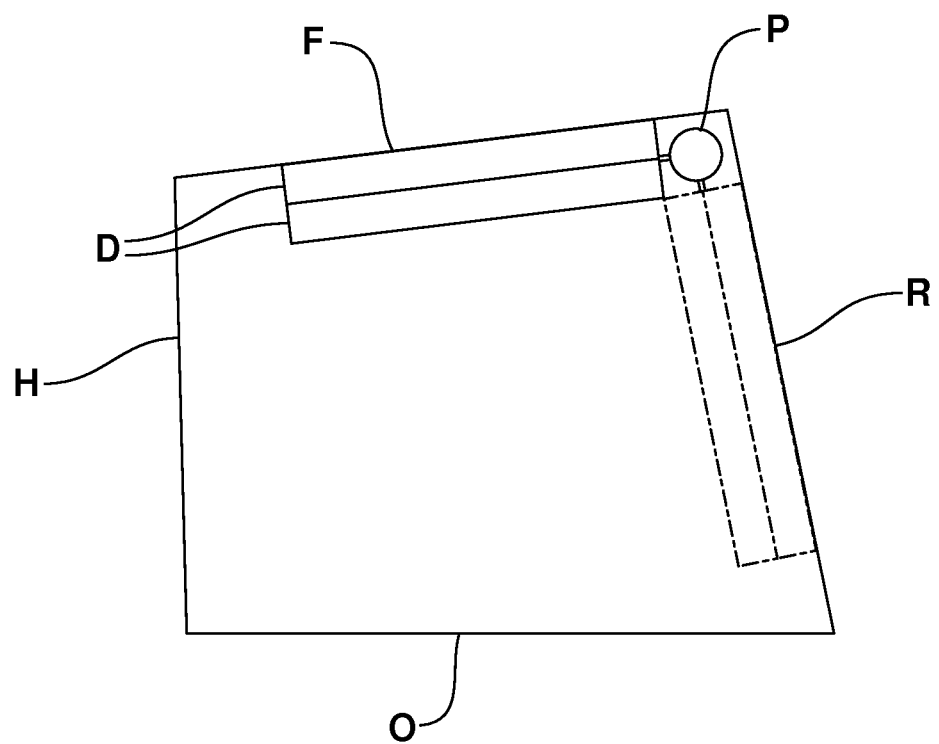
FIG. 1 is a schematic illustration of a prior art vehicle ventilation system inlet duct incorporating a swinging or pivoting door/flap for controlling the flow of fresh air and recirculating air through the ventilation system.

Reference is now made FIG. 6 illustrating the poppet valve 15 in the second position. In this position, the poppet valve 15 has been displaced into the first or upper chamber 62 so that the fresh air inlet sealing face 40 completely engages and seals against the first end wall or top wall 52 completely closing the fresh air inlet 68. Since the poppet valve 15 is in the first or upper chamber 62, the recirculating air sealing face 44 of the poppet valve 15 has been moved away from the recirculating air inlet 70 which comprises a series of openings that extend as much as 360° around the cylindrical sidewall 56 of the inlet housing 50. Accordingly, recirculating air flow passes freely through the recirculating air inlet 70 into the second or lower chamber 64 and then through the blower inlet 72 to the blower 16. While the prior art ventilation system equipped with a swinging door D as illustrated in FIG. 1 limits the recirculating air inlet R to only one side of the inlet duct housing H, the poppet valve 15 of the present vehicle ventilation system 10 allows the recirculating air inlet 70 to extend substantially 360° completely around the housing 50 thereby providing an opening with a greater surface area for enhanced airflow that also simultaneously places a lower power load on the blower motor.

Reference is now made to FIG. 7 illustrating the poppet valve 15 in a third or intermediate position allowing a mixture of fresh air and recirculating air to flow through the inlet duct 14 to the blower 16. Note action arrows C.

Figure 9:
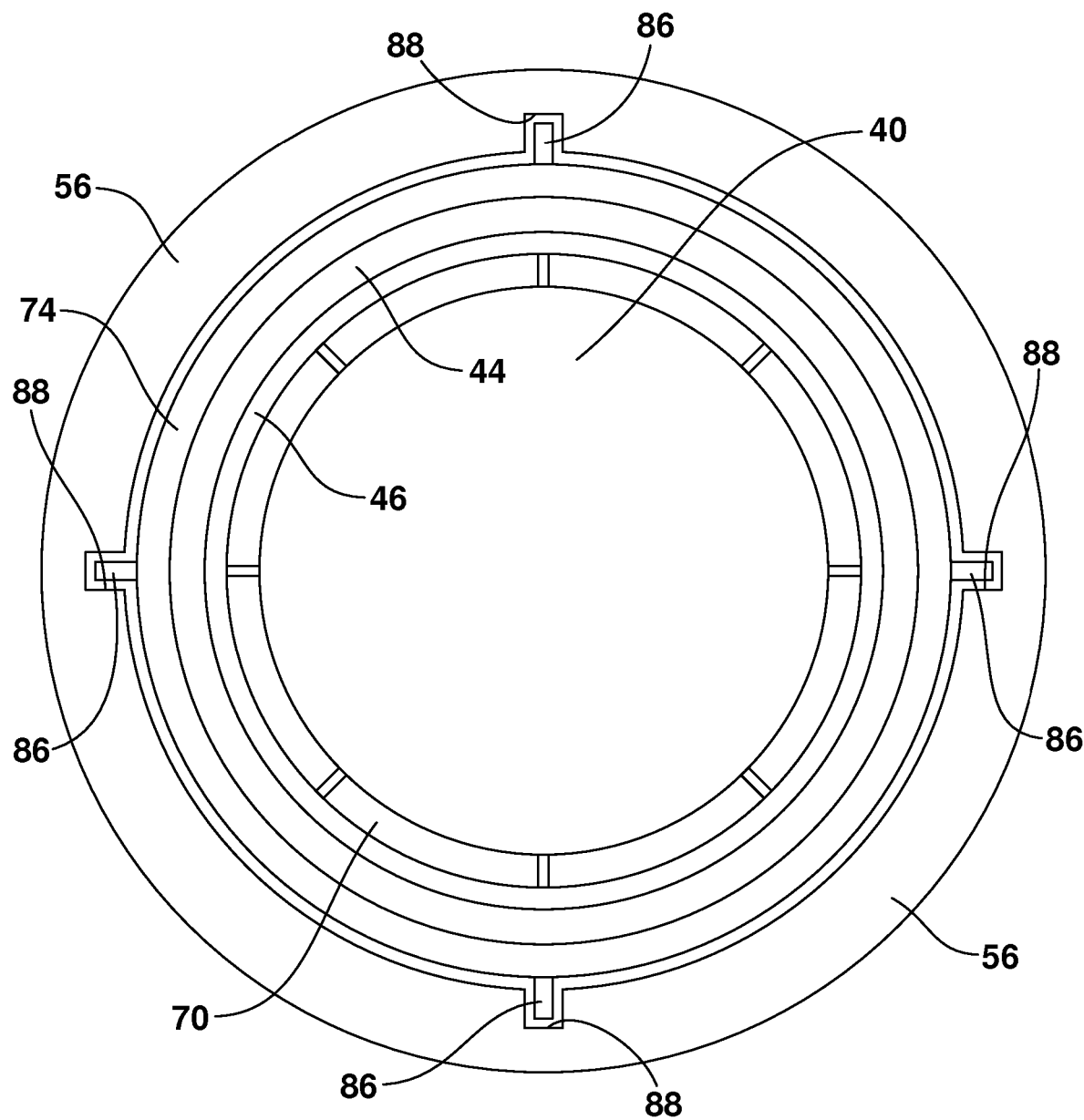
FIG. 9 is a schematic illustration of one possible embodiment wherein the poppet valve includes guide pins received in cooperating guide channels provided in the housing.

Reference is now made to FIGS. 8*a*, 8*b* and 9 illustrating one possible actuator 80 that may be utilized to displace the poppet valve 15 between the various operating positions illustrated in FIGS. 5-7. As illustrated, the actuator 80 may comprise a vacuum motor, an electric motor, a pneumatic drive motor or the like. The actuator 80 is connected to two cams 82 by means of the drive shaft 84. Each cam 82 may have a profile as illustrated in FIG. 8*b*. The poppet valve 15 rides the cams 82 (note the fresh air sealing face 40 riding on the cams 82 in FIG. 8*a*). The poppet valve 15 is guided in the inlet duct housing 50 as it is displaced between the various operating positions by means of the projecting guide pins 86 which ride in guide channels 88 provided in the sidewall 56.

In summary, the vehicle ventilation system 10 provides a number of benefits and advantages including, but not necessarily limited to (a) provision of a more uniform flow of air into the blower 16, (b) provision of a larger recirculating air inlet 70 in the inlet duct 14, (c) packaging benefits associated with an inlet duct of lower overall height, (d) improved sealing capability, (e) lower HVAC system noise and vibration, (f) lower blower motor power consumption, (g) improved blower efficiency, (h) lower pressure drop across the inlet duct and (i) lower tooling costs. Advantageously, the poppet valve 15 incorporated into the vehicle ventilation system 10 is also associated with a beneficial method of controlling the flow of fresh air and recirculating air through a vehicle ventilation system 10. That method may be broadly described as comprising the step of equipping an air inlet duct 14, having a fresh air inlet 68, a recirculating air inlet 70 and a blower inlet 72, with a poppet valve 15. Further, the method includes displacing the poppet valve 15 between a first position opening only the fresh air inlet 68, a second position opening only the recirculating air inlet 70 and a third position opening both the fresh air inlet and the recirculating air inlet. Still further, the method may be described as including the additional step of drawing air from the inlet duct 14 through the blower inlet 72 by means of the blower 16.

The foregoing has been presented for purposes of illustration and description. It is not intended to be exhaustive or to limit the embodiments to the precise form disclosed. Obvious modifications and variations are possible in light of the above teachings. For example, as illustrated in FIG. 4, the lower face opposite the fresh air sealing face 40 may include optional vanes 90 to preswirl the air flow through the poppet valve 15 before it enters the blower 16. This should reduce turbulence and increase operating efficiency. All such modifications and variations are within the scope of the appended claims when interpreted in accordance with the breadth to which they are fairly, legally and equitably entitled.

What is claimed:

1. A vehicle ventilation system, comprising:
an inlet duct including a poppet valve, wherein said poppet valve includes a fresh air inlet sealing face, a fresh air passageway and a recirculating air inlet sealing face, wherein the fresh air inlet sealing face is connected to a lower lip of the recirculating air sealing face by a series of spaced posts and wherein the fresh air passageway extends around an entirety of the poppet valve between the series of spaced posts;
an evaporator core;
a heater core;
an air discharge duct;
a blower moving air from said inlet duct through at least one of said evaporator core and said heater core to said air discharge duct.

2. The system of claim 1, wherein said inlet duct includes a housing having a fresh air inlet and a recirculating air inlet and said poppet valve is displaceable between a first position opening only said fresh air inlet, a second position opening only said recirculating air inlet and a third position opening both said fresh air inlet and said recirculating air inlet.

3. The system of claim 2, wherein said housing includes a first end wall, a second end wall and a cylindrical sidewall, said fresh air inlet being provided in said first end wall and said recirculating air inlet being provided in said cylindrical sidewall.

4. The system of claim 3, further including a blower inlet in said second end wall opposite said fresh air inlet in said first end wall.

5. The system of claim 4, further including an inlet manifold in said housing and a partition dividing said inlet manifold into a first chamber and a second chamber.

6. The system of claim 5, wherein said fresh air inlet opens into said first chamber and said recirculating air inlet opens into said second chamber.

7. The system of claim 6, wherein said blower inlet opens into said second chamber.

8. The system of claim 7, wherein said partition includes an airflow aperture and said poppet valve seats on said partition and extends through said airflow aperture when in said first position.

9. The system of claim 8, wherein said fresh air passageway extends concentrically around said fresh air inlet sealing face and said recirculating air inlet sealing face extends concentrically around said fresh air passageway.

10. The system of claim 9, further including an actuator for displacing said poppet valve between said first position, said second position and said third position.

11. The system of claim 10, wherein said actuator is selected from a group of actuators consisting of a vacuum motor, an electric motor and a pneumatic drive motor.

12. The system of claim 11, wherein said actuator includes a cam connected to said actuator and engaging said poppet valve and said poppet valve includes a plurality of guide pins riding in guide channels provided in said housing.

13. The system of claim 1, wherein said fresh air passageway extends concentrically around said fresh air inlet sealing face and said recirculating air inlet sealing face extends concentrically around said fresh air passageway.

14. The system of claim 13, further including an actuator for displacing said poppet valve between said first position, said second position and said third position.

15. A motor vehicle including the vehicle ventilation system of claim 1.

16. A method of controlling flow of fresh air and recirculating air through a vehicle ventilation system, comprising:
equipping an air inlet duct having a fresh air inlet, a recirculating air inlet and a blower inlet with a poppet valve having a fresh air inlet sealing face, a fresh air passageway and a recirculating air inlet sealing face, wherein the fresh air inlet sealing face is connected to a lower lip of the recirculating air sealing face by a series of spaced posts and wherein the fresh air passageway extends around an entirety of the poppet valve between the series of spaced posts.

17. The method of claim 16, including displacing said poppet valve between a first position opening only said fresh air inlet, a second position opening only said recirculating air inlet and a third position opening both said fresh air inlet and said recirculating air inlet.

18. The method of claim 17, including drawing air from said inlet duct through said blower inlet by means of a blower.

* * * * *